United States Patent
Liu et al.

(10) Patent No.: US 7,082,007 B2
(45) Date of Patent: Jul. 25, 2006

(54) METHOD TO ACHIEVE HIGHER TRACK DENSITY BY ALLOWING ONLY ONE-SIDED TRACK ENCROACHMENT

(75) Inventors: Xiong Liu, Singapore (SG); WeiLoon Ng, Singapore (SG); Joseph Cheng-Tsu Liu, Singapore (SG); UttHeng Kan, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 420 days.

(21) Appl. No.: 09/965,628

(22) Filed: Sep. 27, 2001

(65) Prior Publication Data

US 2002/0071198 A1 Jun. 13, 2002

Related U.S. Application Data

(60) Provisional application No. 60/235,609, filed on Sep. 27, 2000.

(51) Int. Cl.
*G11B 5/596* (2006.01)
(52) U.S. Cl. ............................. 360/77.02; 360/78.04
(58) Field of Classification Search ............ 360/77.02, 360/75, 55
See application file for complete search history.

(56) References Cited

U.S. PATENT DOCUMENTS

| | | | |
|---|---|---|---|
| 5,629,838 A | 5/1997 | Knight et al. ................ 361/782 |
| 5,682,360 A * | 10/1997 | Oshima ..................... 369/13.2 |
| 5,734,524 A | 3/1998 | Ruiz .......................... 360/104 |
| 5,774,294 A | 6/1998 | Fioravanti .................... 360/75 |
| 5,835,300 A | 11/1998 | Murphy et al. .......... 360/77.05 |
| 5,914,594 A | 6/1999 | Mian ........................ 324/210 |
| 5,940,250 A | 8/1999 | McNeil et al. ............. 360/104 |
| 6,025,712 A | 2/2000 | Mian ........................ 324/210 |
| 6,038,106 A | 3/2000 | Aboaf et al. ................ 360/113 |
| 6,049,440 A | 4/2000 | Shu .......................... 360/77.04 |
| 6,061,197 A * | 5/2000 | Wiselogel .................... 360/60 |
| 6,078,458 A | 6/2000 | Fioravanti et al. ....... 360/73.03 |
| 6,088,185 A | 7/2000 | Ratliff et al. ............ 360/77.03 |
| 6,091,567 A | 7/2000 | Cooper et al. ........... 360/77.08 |
| 6,094,806 A | 8/2000 | McNeil et al. .......... 29/603.14 |
| 6,108,156 A * | 8/2000 | Lee et al. ..................... 360/75 |
| 6,185,063 B1 * | 2/2001 | Cameron .................. 360/78.04 |
| 6,437,947 B1 * | 8/2002 | Uno ........................ 360/78.04 |
| 6,798,592 B1 * | 9/2004 | Codilian et al. ............... 360/51 |

* cited by examiner

*Primary Examiner*—Wayne Young
*Assistant Examiner*—Daniell L. Negrón
(74) *Attorney, Agent, or Firm*—Fellers, Snider, et al.

(57) ABSTRACT

A disc drive includes a transducer having a separate element for writing information and a separate element for reading information to and from the disc. In a disc drive designated to read and write long sequential records, the track misregistration budget is reduced to account for previously written tracks not being encroached on one side. An initial track is written. Subsequent tracks are written after a seek in one direction. The subsequent track is written so that the initially written track is overwritten to one side and leaves a track having a width substantially equal to the width of the read element. Records can be written into data bands of a selected number of tracks. A guard band is left between groups of data bands so that data on tracks in subsequent data bands are not overwritten.

10 Claims, 8 Drawing Sheets

METHOD TO ACHIEVE HIGHER TRACK DENSITY BY ALLOWING ONLY ONE-SIDED TRACK ENCROACHMENT

RELATED APPLICATION

This application claims the benefit of U.S. Provisional Application Ser. No. 60/235,609 filed Sep. 27, 2000.

FIELD OF THE INVENTION

The present invention relates to the field of mass storage devices. More particularly, this invention relates to a method and apparatus for setting the track pitch with a budgeted allowance for a track misregistration ("TMR") in a high density disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc drive housing, a disc that is rotated, an actuator assembly that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

To read and write data to the disc drive, the actuator assembly includes one or more arms that support the transducer over the disc surface. The actuator assembly is selectively positioned by a voice coil motor which pivots the actuator assembly about a pivot shaft secured to the drive housing. The disc is coupled to a motorized spindle which is also secured to the housing. During operation, the spindle provides rotational power to the disc. By controlling the voice coil motor, the actuator arms (and thus the transducers) can be positioned over any radial location along the rotating disc surface.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equalize so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on portions of the storage disc referred to as tracks. Transducers, in the form of read/write heads attached to the sliders, located on both sides of the storage disc, read and write information on the storage discs when the transducers are accurately positioned over one of the designated tracks on the surface of the storage disc. As the storage disc spins and the read/write head is accurately positioned above a target track, the read/write head can store data onto the track by writing information representative of data onto the storage disc. Similarly, reading data on a storage disc is accomplished by positioning the read/write head above a target track and reading the stored material on the storage disc. In most disc drives, to write to or read from different tracks, the read/write head is moved radially across the tracks to a selected target track. The movement of the read/write head is called a seek operation. In most disc drives, a seek can be done from one of two directions and the seek can be a short seek from an adjacent track or can be a long seek, wherein the read/write head crosses multiple tracks. The data is often divided between several different tracks.

Most storage discs use a multiplicity of concentric circular tracks. Each track is divided into blocks called sectors. Data and other identification information is stored in the sectors in the form of magnetic transitions. The reading and writing of data is accomplished by read/write heads that are positioned on the required track by the drive's positioning control system. Commonly used are magnetoresistive heads having a separate read element and a separate write element. Generally, the write element is wider than the read element.

The physical act of placing the read/write head over the required track for performing the read and write operations many times is not done with 100% accuracy. The offset between the actual head position and the track center is called the track misregistration. Track misregistration has two aspects, referred to as write-to-write track misregistration and write-to-read track misregistration. The write-to-write track misregistration is the misregistration between a recorded track and an adjacent track, which can result in track-to-track squeeze. The write-to-read track misregistration is the misregistration between the centerline of recorded track and the actual read head position.

Because the physical act of placing the read/write head over the required track for performing the read and write operations is not done with 100% accuracy, a track misregistration (TMR) budget is generally employed to accommodate track misregistration. The track misregistration budget is used in determining the track pitch (distance between tracks) in a disc drive since a portion of distance between tracks must be allotted to account for inaccuracies in positioning the read/write head. The track pitch may also be defined as the space from the center of one track to the center of the adjacent track. The track pitch must be wide enough for the read transducer to sense the correct magnetization written by the write transducer with adjacent tracks present. The track misregistration budget is also used to set a threshold or thresholds for determining a distance, by example in micro-inches, that a disc drive transducer can go off-track prior to generating a write inhibit signal that activates the drive's write inhibit circuit to disable further read/write operations.

As mentioned previously, in most current disc drives the transducer or read/write head can seek to any track from either of two directions. As a result, in most disc drives the current practice is to consider track encroachment by adjacent tracks on both sides of a written track or data bit when determining the track width that includes the track misregistration budget. The track width determined also determines the allowable track density. In other words, since track misregistration can occur on either side of a particular track in current drives, the track misregistration budget must also allow for inaccuracies on both sides of a track. This is to ensure that when writing data on the adjacent tracks on either side of the written track, there is enough spacing between them such that the original data bit still has sufficient width left for the transducer to sense the field.

Disc drives are now being used in specific applications such as for storage of audio or video. In applications such as audio and video, the data is normally recorded in long sequential streams and retrieved sequentially in long streams. When writing long sequential streams of data, track writing occurs sequentially to one side. In other words, when writing a long sequence of data, the first track is filled and each subsequent track seek is in the same direction and the next written track is also in the same direction. Therefore, track misregistration only occurs in one direction. As a result, there is a problem with wasting track space since track misregistration budgets generally account for misregistration on both sides of a track.

Accordingly, what is needed is an apparatus and method that minimizes or reduces the amount of track width that must be allocated for the track misregistration budget. What is also needed is a disc drive with increased track density and hence increased data capacity. What is also needed is a method that can be implemented without having to make complex changes to the disc drive operation. There is also a need for a disc drive that can accurately store and reproduce information which can be replicated as data.

SUMMARY OF THE INVENTION

The present invention is directed to reducing these problems, especially the problem of allocating track misregistration budget on tracks for long sequential records. A disc drive includes a transducer having a separate element for writing information and a separate element for reading information to and from the disc. In a disc drive designated to read and write long sequential records, the track misregistration budget is reduced to account for previously written tracks not being encroached on one side. An initial track is written. Subsequent tracks are written after a seek in one direction. The subsequent track is written so that the initially written track is overwritten to one side and leaves a track having a width substantially equal to the width of the read element. Records can be written into data bands of a selected number of tracks. A guard band is left between groups of data bands so that data on tracks in subsequent data bands are not overwritten.

Advantageously, the method and apparatus of the present invention minimizes or reduces the amount of track width that must be allocated for the track misregistration budget. With less of each track width dedicated to the track misregistration budget, the track width can be reduced to produce a disc drive with increased track density and hence increased data capacity. The method can be implemented without having to make complex changes to the disc drive operation. The disc drive using this method can also accurately store and reproduce information which can be replicated as data. Advantageously, the method and apparatus reduces the TMR budget based on the application for which the disc drive is to be used using current manufacturing apparatus and methods.

These and various other features as well as advantages which characterize the embodiment of the present invention will be apparent upon reading of the following detailed description and review of the associated drawings.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
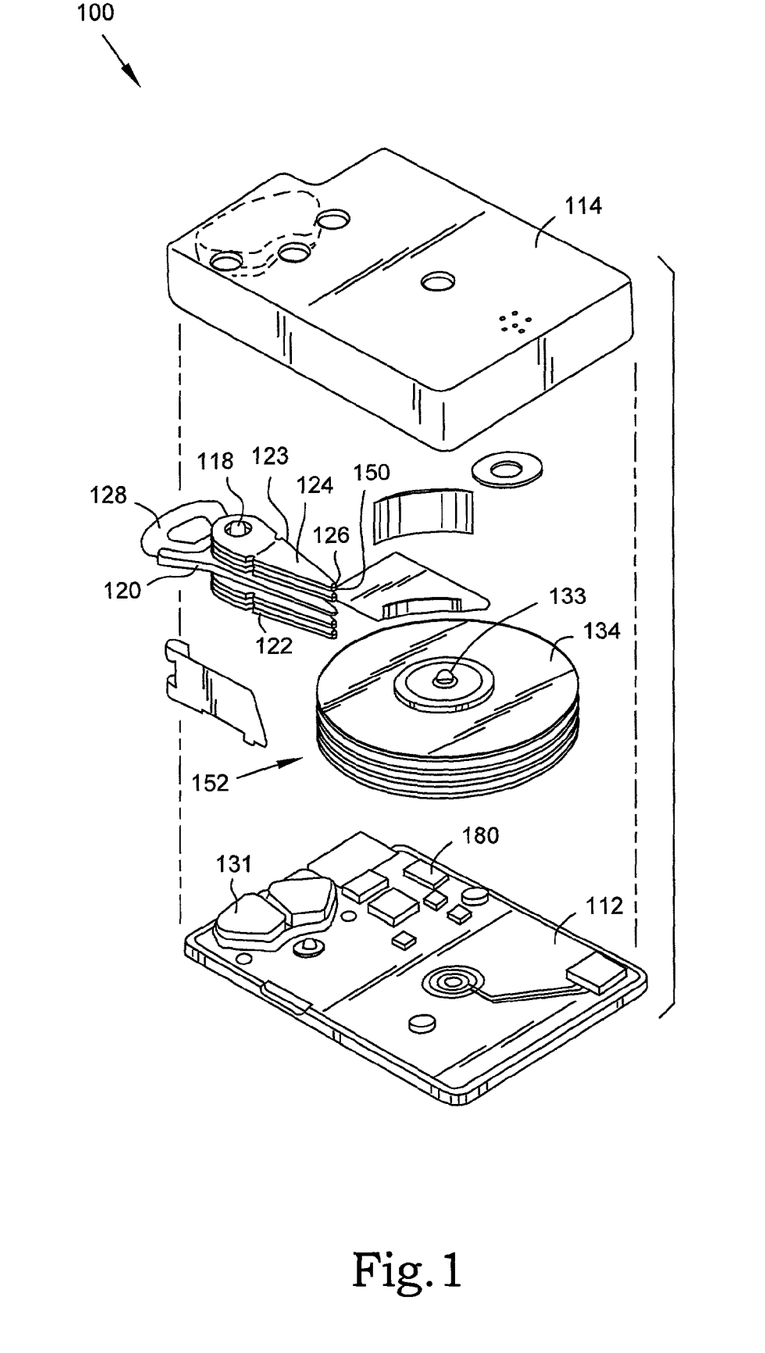
FIG. 1 is an exploded view of a disc drive with a multiple disc stack.

The invention described in this application is useful with most all mechanical configurations of disc drives utilizing either rotary or linear actuation. FIG. 1 is an exploded view of one type of a disc drive 100 having a rotary actuator. The disc drive 100 includes a housing or base 112, and a cover 114. The housing 112 and cover 114 form a disc enclosure. Rotatably attached to the housing 112 on an actuator pivot shaft 118 is an actuator assembly 120. The actuator assembly 120 includes a comb-like structure 122 having a plurality of arms 123. Attached to the separate arms 123 on the comb 122 are load beams or load springs 124. Load beams or load springs are also referred to as suspensions. Attached at the end of each load spring 124 is a slider 126 which carries a magnetic transducer head 150. The slider 126 with the transducer 150 form what is frequently called the head. It should be noted that many sliders have one transducer 150 and that is what is shown in the figures. However, this invention is equally applicable to sliders having more than one transducer, such as what is referred to as an MR or magnetoresistive head in which one transducer 150 is generally used for reading and another is generally used for writing.

On the end of the actuator assembly 120 opposite the load springs 124 and the sliders 126 is a voice coil 128. Located above and below the voice coil 128 is a first magnet 130 and a second magnet 131. As shown in FIG. 1, the first magnet 130 is associated with the cover 114 while the second magnet is adjacent the housing 112. The first and second magnets 130, 131, and the voice coil 128 are the key components of a voice coil motor which applies a force to the actuator assembly 120 to rotate it about the actuator pivot shaft 118. Also mounted to the housing 112 is a spindle motor (not shown). The spindle motor includes a rotating portion called the spindle hub 133. In this particular disc drive, the spindle motor is within the hub. In FIG. 1, a number of discs 134 are attached to the spindle hub 133. In other disc drives, a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or, alternatively, under the hub.

The disc drive 100 includes the mechanical components discussed above as well as various electronic components such as a printed circuit board (not shown) typically attached to the lower (as viewed in FIG. 1) side of the housing 112. Without the circuit board and other electronics, the disc drive is often referred to as a head disc assembly or HDA 152. Stated alternatively, the mechanical components, including the drive housing 112, cover 114, actuator assembly 120, pivot shaft 118, arms 123, transducer heads 150, spindle hub 133, and discs 134 among others generally define the HDA 152. The HDA is a convenient sub-assembly for completing various manufacturing processes including servo track writing. For instance, the HDA provides physical access to the voice coil 128 during manufacture but can thereafter be sealed (hermetically if necessary) to ensure that the internal components remain substantially contaminant-free. Near the end of production, the drive electronics are assembled to the HDA 152 to produce the disc drive 100.

Figure 2:
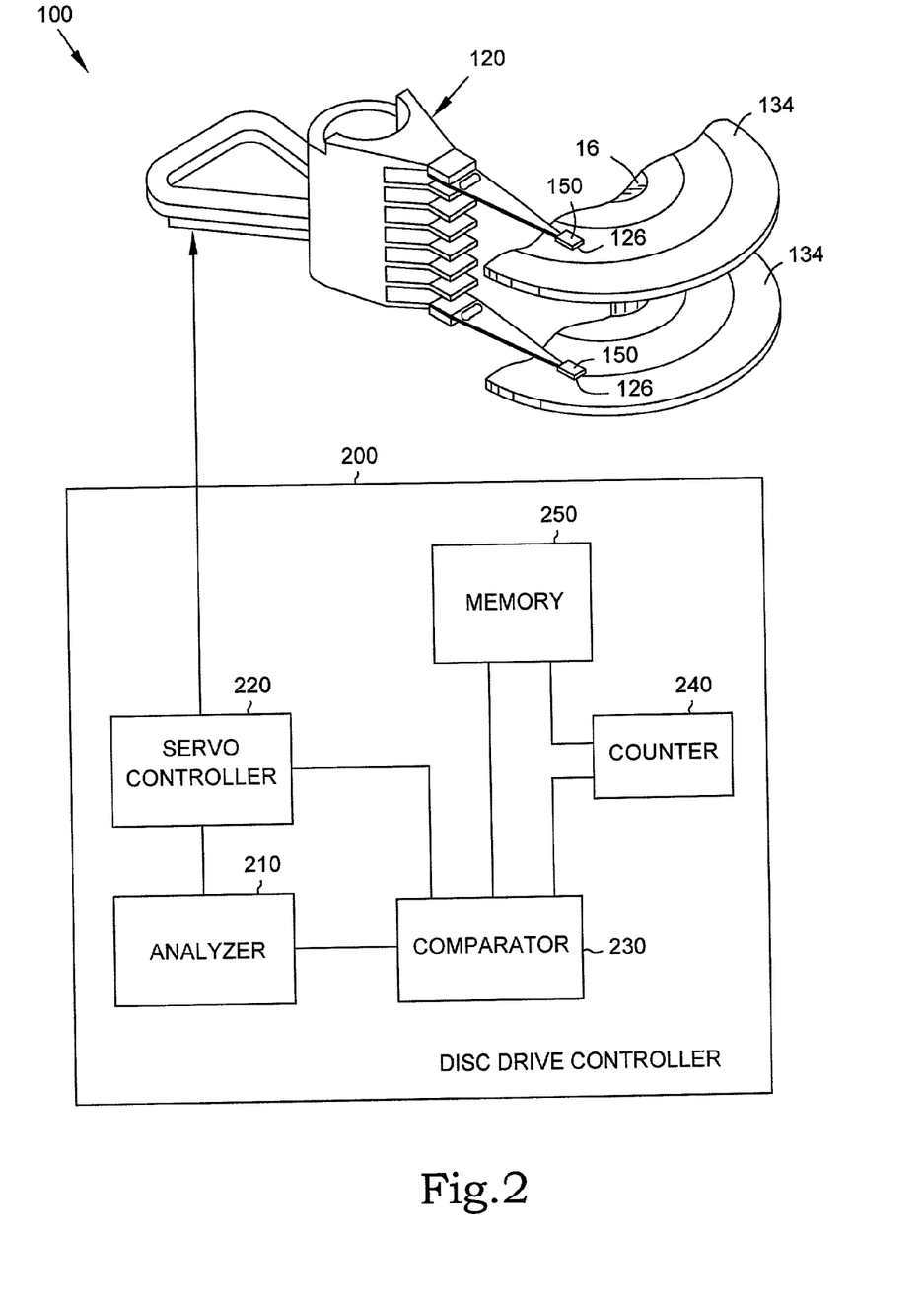
FIG. 2 is a schematic representation of a disc drive including portions of the disc drive controller used in adjusting seek profile parameters of the disc drive to eliminate resonance in an actuator arm of the disc drive.

FIG. 2 is a schematic representation of the disc drive 100 which shows further detail of selected portions of a disc drive controller 200. As shown in FIG. 2, the disc drive 100 includes at least one disc 134 rotatably attached to the base through a shaft 16. The disc drive 100 also includes an actuator assembly 120 having a slider 126 and a transducer 150 for reading and writing to the disc 134. The transducer 150 includes a separate read element and a separate write element (shown in FIG. 3 and others). The actuator 120 carries the transducer 126 in a transducing relation with respect to the disc 134. A disc drive controller 200 is coupled to the actuator assembly 120, and includes a servo controller 220 to monitor settle times during operation of the disc drive. The disc drive controller 200 further includes a memory 250 for storing values associated with the seek profile.

Figure 3:
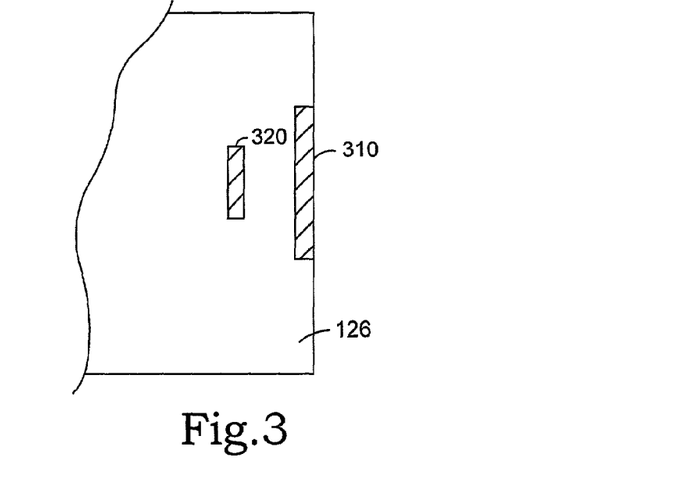
FIG. 3 is a schematic representation of a transducer having a separate write element and a separate read element.

Referring now to FIG. 3, shown therein is a schematic representation of a transducer 150 having a separate read element 320 and a separate write element 310. The transducer 150 is generally integral with the slider 126. The write element 310 is wider than the read element 320. A magnetoresistive transducer is a transducer that has a separate write element and read element. The write element 310 is generally a thin film element which is placed onto the trailing edge of a slider 126. The read element 320 is magnetoresistive and is generally located between the write element and the leading edge of the slider 126. Generally shields are placed between the read element and the write element so that the magnet flux from the write element 310 does not reach the read element 320. These shields are not shown for the sake of clarity and since they are not necessary for an understanding of the embodiment of this invention.

Figure 4:
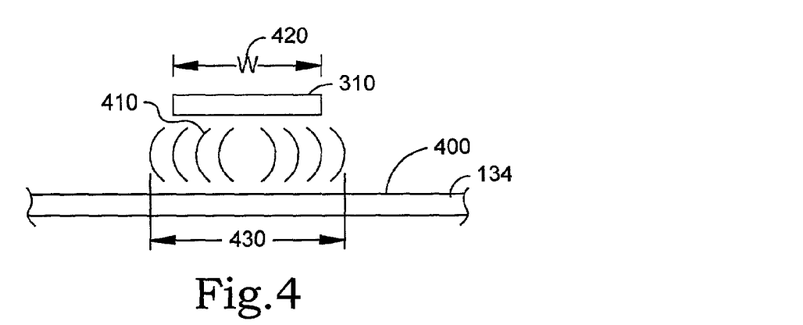
FIG. 4 is a schematic view of a write element writing to a disc of a disc drive.

FIG. 4 is a schematic view of a write element 310 while it is writing to a disc 134 in a disc drive 100. Specifically, the write element 310 is writing to one recording surface 400 of the disc 134. Only a portion of the disc 134 is shown for the sake of clarity. The write element operates to produce lines of magnetic flux which emerge from the write head 310. The lines of flux carry the reference numeral 410. The lines of flux 410, as can be seen from FIG. 4, fringe outwardly beyond the width of the write element 310. As a result, generally the width of the write head 310, as depicted by reference numeral 420, is generally different than the width written to the surface 400 of the disc 134. Typically, the width 430 of the written-to track is wider than the width of the head 420. It should be noted, however, that the width of the written-to track may be narrower than the width of the write head 420 in some instances. The important thing to note is that the width of the head 420 is typically different than the width of the track or the width of the transitions which are written to the disc surface 400.

Figure 5:
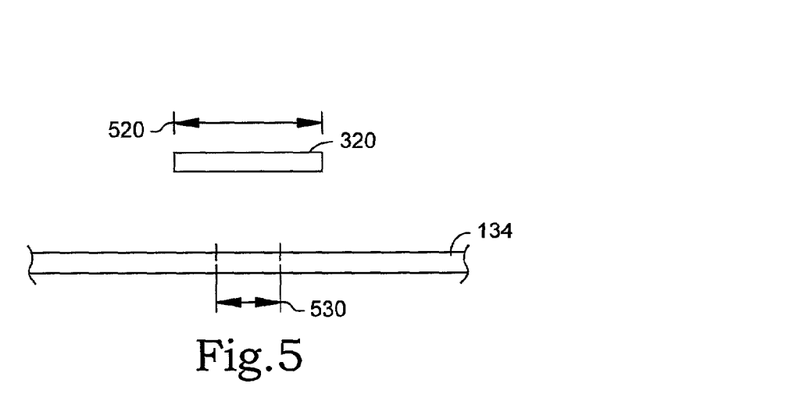
FIG. 5 is a schematic view of a read element reading from a disc of a disc drive.

FIG. 5 is a schematic view of a read element 320 reading from a disc 134 of a disc drive 100. More specifically, the width of the read head 320, depicted by reference numeral 520, is different than the width of the track having transitions depicted by reference numeral 530. In other words, the width of the read head 520 is different than the width of the read-from track 530. Typically, the read head is capable of reading a read-from track width which is narrower than the width of the read head 520. A successful read is typically a read that does not result in hard error or does not result in soft error rates high enough to reduce the efficiency of the reads.

In some drives 100, there is the possibility that tracks may be written on either side of an initially written track. Since there is a possibility that written data on a track may be corrupted or encroached on or squeezed by writing to an adjacent track on either side of a particular track, the track pitch is set to allow for overwriting of both track edges so that the final initially written track is at least as wide as the read width of a read element 320.

Conventional disc drives center the write head over some part of the track (the write-center line) relative to the servo marks or data, and they also center the read head over the same part of the track relative to the servo mark. Tracks are typically spaced with a track-to-track spacing that is narrower that the width of the write head. Suppose track N+1 is written. When the previous track N or next track N+2 is later written, the write head can overwrite the edge portions of track N+1 (that were written when the track N+1 data was written) as long as what remains of the original track N+1 is about as wide as the read-from track width of the read head. Because such drives allow data to be written and read in a random manner, both track N and track N+2 can be written after track N+1 (thus overwriting both the inner-side edge and the outer-side edge of track N+1)

So the minimum track pitch ("TP") is set to:

$$TP=(WW+RW)/2 \quad \text{Equation 1}$$

where,

WW=width of the write head including an erase band
RW=width of the read head

In the case of a transducer that has a WW equal to 4 units and a RW equal to 2 units, the track pitch (TP) is equal to 3 units.

Figure 6:
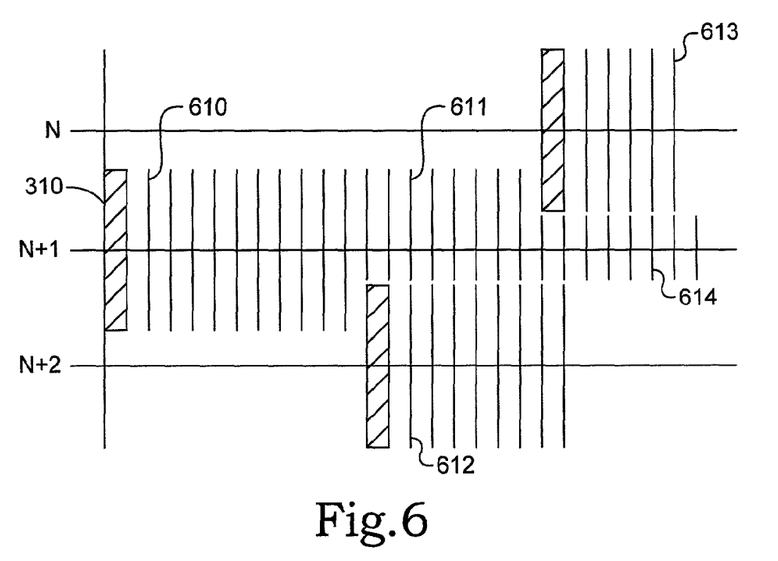
FIG. 6 is a schematic view of a set of three tracks written at three different times in a disc drive in which tracks may be written on either side of an initially written track N+1.

FIG. 6 is a schematic view of a set of three tracks written at three different times in a disc drive 100 in which the tracks may be written on either side of an initially written track N+1.

Figure 7:
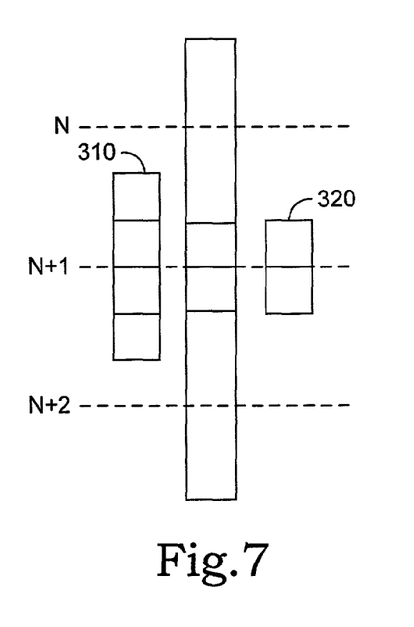
FIG. 7 is a schematic view of a set of three tracks of a disc drive after tracks have been written on either side of an initially written track N+1.

FIG. 7 is a schematic view of a set of three tracks of a disc drive after the tracks have been written on either side of the initially written track N+1. As shown in FIG. 6, there are three tracks labeled N, N+1 and N+2. A very small section of track is being looked at in this particular schematic. Generally, the tracks are circular. However, since such a small portion is being shown, the tracks N, N+1 and N+2 are shown as straight lines. The track N+1 is first written, as depicted by transition lines 610, associated with track N+1. The track N+2 is written next, as depicted by the long transition lines 612. In each instance, a write head 310 is shown on each of the tracks N, N+1 and N+2. The head is shown on the three different tracks, however, it should be noted that this is the same head at three different times and, therefore, the track N+1 is initially written, the head 310 is moved to a different track N+2 and then writes transitions to that track, and finally head 310 moves to track N and writes to that particular track. The result of writing to track N+2 is that the transitions 610 of the track N+1 are overwritten along one edge of the track N+1. The as-written width of the write head 310, in this example, is four units wide. The read head or read width necessary to get an accurate signal is two units wide. Therefore, the pitch is set at three units, as derived by Equation 1. Thus, the write head 310, being four units wide and writing to a track which is three units away from the original write signal, erases or removes one unit of width of the written signal, as depicted by transitions 611 shown that are three units in length. At a third time, the write head 310 writes to track N. The write head 310 is centered on track N during the write process. The write head produces transitions that are four units in length, as shown by reference numeral 613. By writing to track N, one unit of width is removed from the transitions 611 to produce transitions 614 which are of a length of two units. The end result is that a track having transitions 614 at least two units in length, can be found at track N+1. Of course, it should be noted that track N+1 can be written and a track beyond N+2 can be also written, to produce transitions of two units in length. As long as any track can be written to on either side of an originally written track, the transitions will be erased along their edges to produce transitions, such as 614, which are two units in length. Thus, on any track of the disc drive shown in FIGS. 6 and 7, there will be a readable track having transitions which are at least two units in length. As shown in FIG. 7, the transducer or slider is centered on the track N+1 during both the read operation and during the write operation. By centering the transducer and specifically the read transducer 320 onto the track N+1, the amount of signal left of two units in length, can be read by the read transducer 320.

It should be noted that if the read width or the write width changes, the track pitch will change as well as the length of the transition left so that it can be read. Using Equation 1, the track width can be determined under these other conditions. However, the example of a read width of two and a write width of four, is used throughout these illustrations or schematics, to provide a consistent illustration.

Also it should be noted that some of the figures show the write head 310 exactly in line with the read head 320. When using a rotary actuator, sometimes the read head and write head will not be exactly centered over a track, especially when it is not in the center of the data band and may have to be jogged slightly so that it is centered over the particular track. The illustrations presume that the actuator is positioned in a position where the write head 310 and read head 320 will be exactly centered over the track as the transducer flies over the track.

Of importance, from looking at FIGS. 6 and 7, is that when tracks may be randomly written on either side of an initially written-to track, such as N+1, the subsequent writes to adjacent tracks will erase a portion of the transition signal on the initially written track, to produce a track which is less wide than the read width of any written track when the write width is greater than the read width associated with a particular transducer 150.

For some applications, such as a hard-disc-drive-based video recorder/player device, the vast majority of disc operations are large sequential write or read operations, each involving many adjacent tracks that are accessed sequentially (e.g., the tracks are written sequentially from outer-diameter tracks towards inner-diameter tracks. For large (multiple-track) operations, if N represents a track being written, then the next track N+1 written will always be to the innerdiameter side of N. Thus, only the inner-side edge of track N will or can ever be overwritten. Thus, no allowance need be provided for overwriting the outer-side edge of track N or any similar track reserved for multiple-track operations, so the track-to-track spacing can be smaller, allowing more data per drive.

Figure 8:
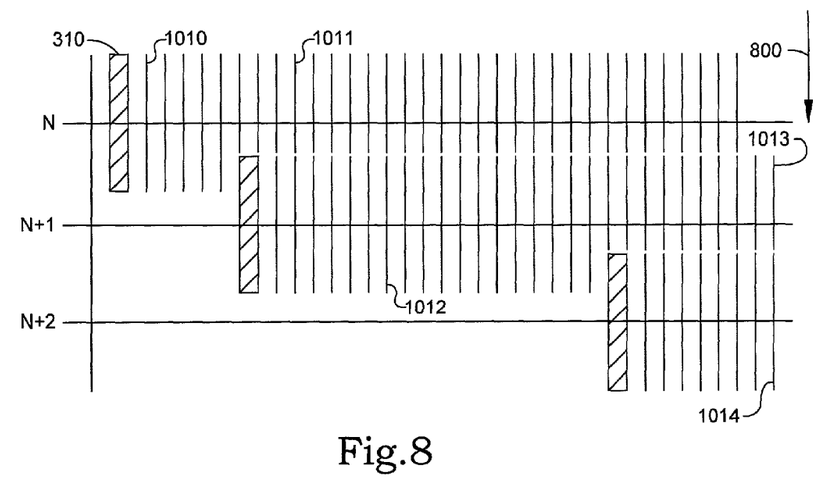
FIG. 8 is a schematic view of a set of three tracks written at three different times in a disc drive in which tracks may be written only to one side of an initially written track N.
Figure 9:
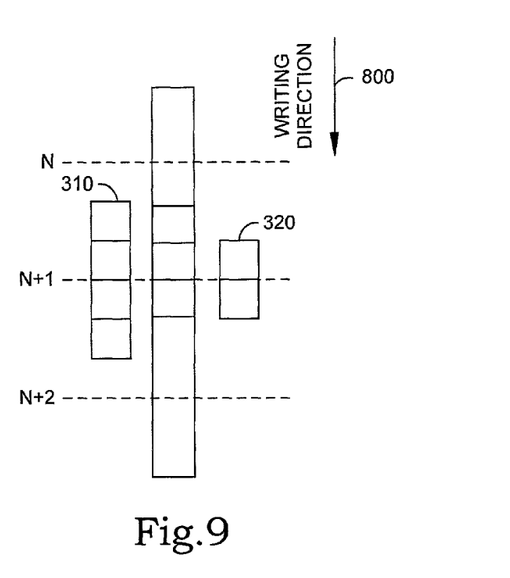
FIG. 9 is a schematic view of a set of three tracks of a disc drive after tracks have been written on the one side of an initially written track N.

FIGS. 8 and 9 show the effect of accessing toward the inner diameter of the disc, as depicted by arrow 800, so that the track N, as originally written, is only overwritten along the inner edge or along one edge of the track. In other words, since accesses are always moved to one side of the originally written track in a video or audio or some other long sequence type of data, there is not the possibility that the track will be overwritten on one of the sides of the track N. In other words, the possibility only exists that the track will be overwritten along one edge. Again we are using the write head 310 having a write width of four units and we're using a read head having a read width of two units. FIG. 8 shows a schematic view of a set of three tracks N, N+1, N+2 which are written to at three different times in a disc drive 100 where the tracks may be written only to one side of an initially written track N. Again, the write head 310 is shown at three different times over the three different tracks. This is a reflection of three different writes at three different times, rather than a transducer that actually has three write heads. Initially, track N is written and produces transitions having four units in length, as depicted by lines 1010. At a second time, the write head is positioned over track N+1 and writes transitions 1012 which are four units in length. The originally written transitions 1010 are overwritten on the inside edge by one unit, thus leaving transitions 1011 which are three units wide. At a further subsequent time, the write head 310 writes to track N+2. The write element or write head is centered over track N+2 and again overwrites one edge of the track written to track N+1. The transitions written by the head to N+2 are four units in length and are shown by the reference numeral 1014. The result of overwriting to the one edge of track N+1 makes the transitions 1012 one unit less wide, or three units in width, as depicted by reference numeral 1013.

FIG. 9 is a schematic view of the set of three tracks of a disc drive after they have been written on one side of an initially written track N. During the read operation, the write element 310 and the read element 320, when reading for example track N+1 are centered over the track N+1. The read element 320 having a read width of two units is then reading a track written to N+1 which is three units wide. Since the track N+1, all of the tracks for that matter written, have widths of three units, further savings can be made on the track width which leads to the next example.

Figure 10:
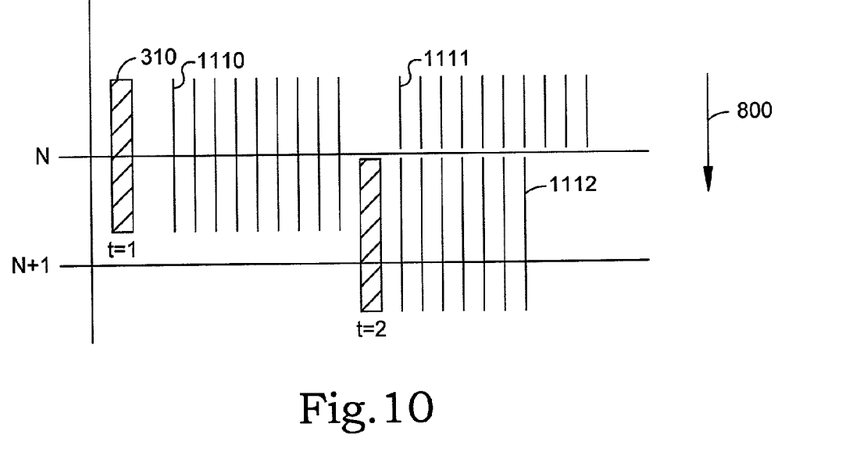
FIG. 10 is a schematic view of a set of two tracks written at two different times in a disc drive in which tracks may be written only to one side of an initially written track N and in which the write head is offset to produce a track having a width substantially equal to the width readable by the read head.

In this particular example, accesses are only done in one direction toward the inner diameter, as depicted by reference arrow 800 in FIG. 10. The write width is four units in length. Track N is first written to and produces transitions four units in length, as depicted by reference numeral 1110. FIG. 10 is a schematic view of two tracks N and N+1 which are written to at two different times in which the tracks may be written only to one side of an initially written track N and in which the write head 310 is offset to produce a track having a width substantially equal to the width of the width readable by the read head 320. When track N+1 is written, the write head is shifted upward or in a direction so that the amount of track erased from the originally written track N which is overwritten will produce a track having approximately the same width as the width readable by the read head 320. In other words, the edge of the initially written track is overwritten on a subsequent pass of the head 310 so that only a track having a width equal to that readable by the read head is left. As can be seen in FIG. 10, the write head 310 is shifted by one unit so that the transitions 1110 are overwritten to leave transitions 1111 which are two units in width which is readable by the read head 320. The write head 310 produces transitions which are four units in length, as depicted by reference numeral 1112. The end result is that the write head 310 when centered on a track N can be used to produce a read signal having a width equal to the width readable by the read head.

Figure 11:
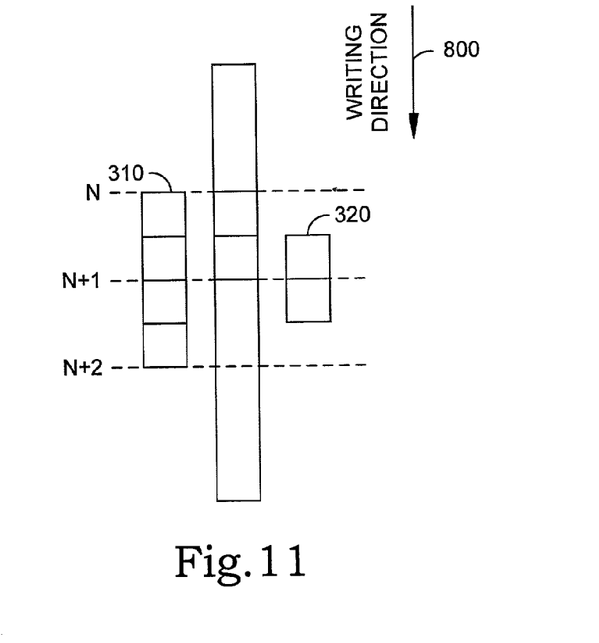
FIG. 11 is a schematic view of a set of three tracks of a disc drive in which tracks have been written to one side of an initially written track N so that the remaining data occupies a track having a width approximately equal to the width of the reader element, where the reader element is offset from the write element during a read operation.

FIG. 11 shows the effective width of the write data in a sequential write operation assuming that the write width equals four, the read width equals two, and the track pitch has now been reduced to two, rather than three. In this particular scheme, rather than offsetting the head at N+1, the track pitch is reduced to two so that the write head can always be centered on the particular track to produce a signal having a width equal to the read track width associated with the read head 320. In this particular case, if during a read operation, the read element is centered on track N+1, the amount of transitions that will be seen are only half of the transitions from a first track and half the transitions from a second track.

Figure 12:
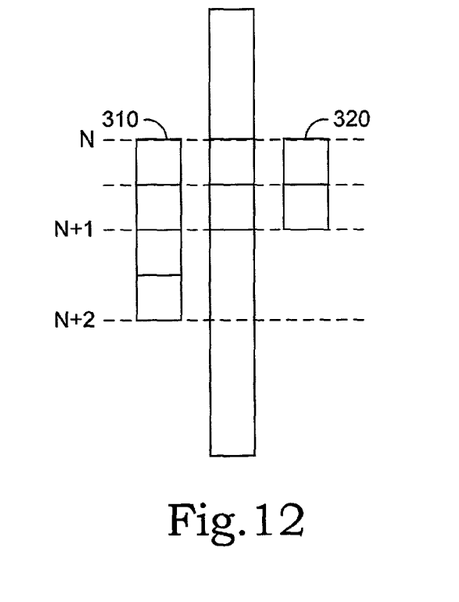
FIG. 12 is a schematic view of a set of three tracks of a disc drive in which tracks have been written to one side of an initially written track N so that the remaining data occupies a track having a width approximately equal to the width of the reader element, showing the read element not offset from the track center during the read operation.

To cut down on errors, read head 320 is offset during the read operation to center the read element over the resulting track, as shown in FIG. 12.

For audio/video application where the data is normally recorded or retrieved sequentially in long streams, and track writing is expected to occur sequentially to one side, the possibility of data corruption happens only on one side, as illustrated in FIGS. 8–12. The write data is now only corrupted by the adjacent track on one side, so the effective width of the written data can be considered as:

$$WW/2 \text{ Uncorrupted side} \quad \text{Equation 2}$$

$$(TP-WW)/2 \text{ Corrupted side} \quad \text{Equation 3}$$

The final effective width of the write data is TP rather than RW as shown in FIG. 3. So the minimum TP will be given as:

$$TP=RW \quad \text{Equation 4}$$

This shows that a narrower track pitch can be realized without the need for a narrower transducer.

Further if a track center offset method is applied, during read operation, the head is preset to shift to non-corrupt side. The offset value can be calculated as $$\text{Offset}=(WW-TP)/2 \quad \text{Equation 5}$$

With this technology, the off-track capability for TP=RW is the same as the TP=(WW+RW)/2. So a higher TPI can be achieved. Alternatively, the WW can be allowed to be wider and will not affect the track pitch; thus, WW spec can be relaxed and makes the writer fabrication easier.

In today's practice, to increase track density, a narrower WW is normally needed to accommodate and to avoid the encroachment from both sides. The narrower the WW, the more difficult it is to fabricate and also its performance will degrade due to the reduced off-track capability. Advantageously, the proposed method allows the increase in track density without the need for narrower transducer and resolving this conflict about the narrow WW.

It should be noted that the amount of disc capacity increase is significant. If the written-to track width is twice the read-from track width, then about 50% more tracks can be placed giving about 50% more data. If the written-to track width is three times the read-from track width, then about twice as many tracks can be placed giving about twice as much (about 100% more) data.

In hard-disc-drive-based video-recorder devices, the program code is typically written once by the manufacturer, and thus can be written in the same manner as video, i.e., as long sequential writes of many adjacent tracks.

One aspect of the present invention provides a method for increasing track density of a disc drive, the disc drive having a read transducer and a write transducer for a first disc surface wherein the write transducer produces a wider effective track width than an effective track width of the read transducer. The method includes (a) writing onto the first disc surface with the write transducer a first plurality of adjacent tracks having a track-to-track spacing substantially equal to the effective track width of the read transducer; and (b) reading with the read transducer the first plurality of adjacent tracks. This provides the advantage of increasing track density for portions of the disc drive used for writing and reading long sequences of data, for example, video data. This is particularly useful when write operations write to tracks that are sequential in a single direction, e.g., from the outer diameter to the inner diameter. However, this type of operation, in some embodiments, will overwrite or erase one additional track at the end of the operation that is not then written with new data. For video applications, this is not an important detriment, since most operations write video information, and losing the first track of prior recordings will not be important. In some embodiments, at least one additional track, called a guard band, is provided between each distinct data area, in order that data that is desired to be kept is not overwritten by write operations to the data stored.

In some embodiments, some data is written to and read from the disc drive in a random manner, e.g., variables for storing the times and channels of television programs to be recorded or played. For such variable data, the operating system can determine how much data will be written per track, and then allow at least one-track's worth of space on either side of each such variable data track for random writes and reads. In a video-recorder device, the amount of such data is expected to be quite small, so the extra space reserved for buffering around such data is a minimal portion of the drive capacity.

In other embodiments, one portion of the drive has tracks with the conventional track-to-track spacing of approximately ((the written-to track width of the write transducer)+ (the read-from track width of the read transducer)) divided by two. This portion can then be fully utilized for random writes and reads. Another portion has tracks with the condensed track-to-track spacing of the present invention utilized for large sequential operations (i.e., many sequential tracks) or for situations where write operations are performed in the same direction (OD to ID track numbers only) over large numbers of tracks (e.g., where several short write operations result in tracks being written in the same direction—OD to ID).

Figure 13:
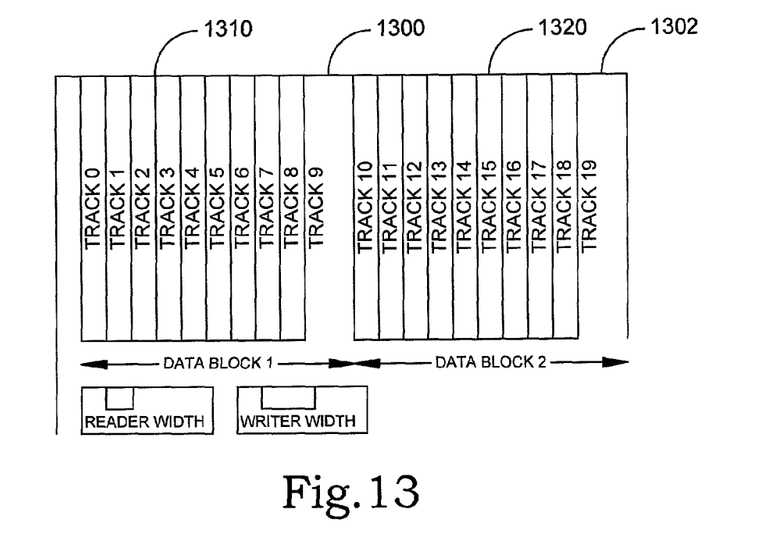
FIG. 13 is a schematic view of grouping tracks into data bands which are protected by guard bands

As shown in FIG. 13, data tracks in the disc drive are divided into data blocks where each block consists of at least two data tracks and protected by a data guard band 1300. Writes to such tracks must fill the entire data block. This method finds application in storing audio/video data that is sequential in nature. As shown in FIG. 13, 10 tracks are grouped into a data block 1310 and track 9 is the last track of data block 1310. Writes to data block 1310 begin from track 0 to 9 and shall not start in between. Writes to a data block 1320 begin from track 10. Track 10 is placed sufficiently away from track 9 to avoid track encroachment on this track and acts as a guard band 1300. Track 19 acts as another guard band 1302. The number of tracks per block above is for illustration purpose, in practice it can be implemented with more tracks per block and should be optimized depending on the application.

To facilitate the ease of reading and writing to these data blocks, an embedded file management system can be implemented.

Figure 14:
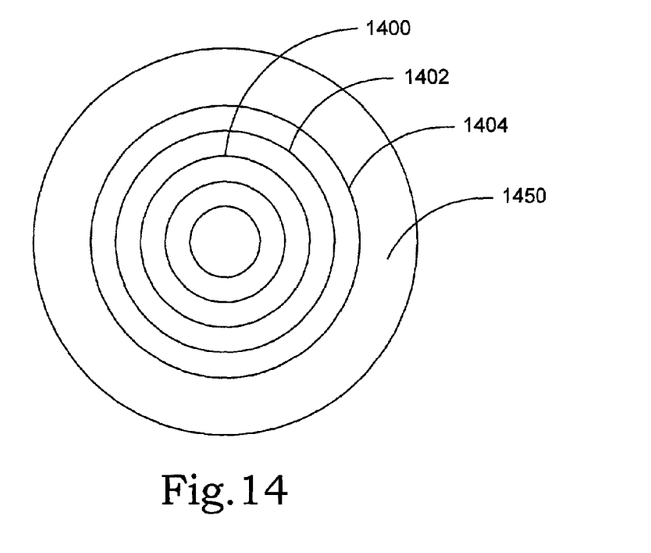
FIG. 14 is a top view of a disc surface showing a set of guard bands.

FIG. 14 is a top view of a disc surface showing a set of guard bands 1400, 1402 and 1404. The entire disc surface of the disc shown in FIG. 14 may be used to write sequential data blocked into data blocks or a portion of the surface may be used to write long sequential records of data to the disc in data blocks and another portion of the disc drive may be used to write short bursts of data where the track may be overwritten on both sides. It should be noted that if the length of the data block is fixed, the guard bands 1400, 1402 and 1404 will be more closely spaced together toward the outer diameter of the disc. Reference numeral 1450 shows the portion of the disc shown in FIG. 14 which may be either written to as long sequential data tracks or written to with a track pitch so that data may be written to either side.

In some embodiments, the method further includes (c) writing with the write transducer a second plurality of adjacent tracks having a track-to-track spacing substantially equal to (the effective track width of the read transducer)+ (the effective track width of the read transducer)/2; and (d) reading with the read transducer the second plurality of adjacent tracks. This provides the advantage of allowing write operations to sequential tracks in either direction, thus allowing control or programming information to be written without having to leave one track between each area that will be written to for such short data operations as control or programming data operations.

One aspect of the present invention provides a disc drive having a rotating disc assembly having a first disc surface, a read transducer operating in a transducing relationship to the first disc surface and a write transducer operating in a transducing relationship to the first disc surface, wherein the write transducer as it writes produces a wider effective written-to track width than an effective read-from track width of the read transducer. The disc drive provides a first plurality of adjacent tracks on the first disc surface having a track-to-track spacing substantially equal to the effective read-from track width of the read transducer.

Another aspect of the present invention provides a disc drive that includes a disc having a first surface, a read transducer, a write transducer, and a controller. The write transducer is positioned proximate to the first recording surface of the magnetic disc for writing information on the first recording surface. The read transducer is also positioned proximate to the first recording surface of the magnetic disc for reading information from the first recording surface. The controller is within the disc drive and is coupled to the read and write transducers. The controller positions the center of the write transducer over a target track on the first disc surface at a write offset relative to a servo position and the controller positions the center of the read transducer over the target track at a read offset relative to the servo position, wherein the read offset is different than the write offset.

CONCLUSION

In conclusion, disclosed is a method for increasing track density of a disc drive 100. The disc drive 100 has a read transducer 320 and a write transducer 310 for a first disc surface. The write transducer 310 produces a wider written-to track width than a read-from track width of the read transducer 320. The method includes writing a first plurality of adjacent tracks N, N+1, N+2 having a track-to-track spacing substantially equal to the read-from track width of the read transducer 320 onto the first disc surface with the write transducer 310. The method also includes reading the first plurality of adjacent tracks with the read transducer 320. The method also includes writing with the write transducer 310 a second plurality of adjacent tracks having a track-to-track spacing substantially equal to (the written-to track width of the write transducer)+(the read-from track width of the read transducer)/2. The second plurality of tracks are also read with the read transducer 320. Writing to the first plurality of tracks includes moving the write transducer 310 in a single direction 800 when writing to an adjacent track. The write transducer 310 has a first edge and a second edge. Writing to the first plurality of tracks includes moving the write transducer 310 in a single direction 800 when writing to an adjacent track, and positioning the first edge of the write transducer is substantially equal to the track width between writing to a first track N and a next track N+1. The method includes writing a sequential record to a selected number of a plurality of adjacent tracks while moving the write transducer in a single direction 800 between writing to adjacent tracks, and placing a guard band 1300, 1302, 1400, 1402, 1404 after the selected number of a plurality of adjacent tracks 1310. Placing a guard band 1300, 1302, 1400, 1402, 1404 after the selected number of tracks 1310 includes adding a guard band 1300, 1302, 1400, 1402, 1404 having a width of at least one writer width.

Figure 15:
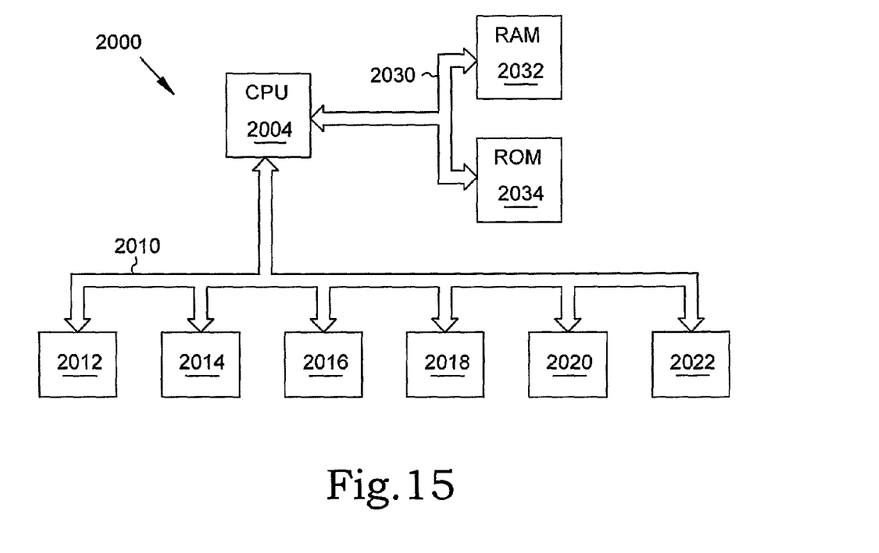
FIG. 15 is a schematic diagram of an information handling system.

A disc drive includes a rotating disc assembly having a first disc surface 400, a read transducer 320 operating in a transducing relationship to the first disc surface 400, and a write transducer 310 operating in a transducing relationship to the first disc surface 400. The write transducer 310 produces a wider written-to track width than a read-from track width of the read transducer 320. The disc drive also has a first plurality of adjacent tracks 1310 on the first disc surface with a track-to-track spacing substantially equal to the read-from track width of the read transducer 320. The disc drive 100 also may have a second plurality of adjacent tracks 1450 on the first disc surface having a track-to-track spacing substantially equal to (the written-to track width of the write transducer)+(the read-from track width of the read transducer)/2. The disc drive is also part of a magnetic disc storage system further including an information processing system 2000, a memory system 2032, 2034 operatively coupled to the information processing system 2004, an input/output system operatively coupled to the information processing system, and a data channel 2010 that operatively couples the information processing system to the disc drive. The first plurality of adjacent tracks 1310 on the first disc surface 400 have a track-to-track spacing substantially equal to the read-from track width of the read transducer. The write transducer 310 has a first edge and a second edge. The first plurality of adjacent tracks 1318 is produced by moving the write transducer 310 in a single direction 800 when writing to an adjacent track, wherein the first edge of the write transducer 310 is moved to a position substantially equal to the track width to write to the next track. The write transducer 310 writes a first sequential record to a selected number of a first plurality of adjacent tracks 1310, and writes a second sequential record to a selected number of a first plurality of adjacent tracks 1320. The transducer places a guard band 1300 between the first sequential record 1310 and the second sequential record 1320.

A magnetic disc storage system includes a disc drive 100 that includes a magnetic disc assembly having a first recording surface 400, a write transducer 310 positioned proximate to the first recording surface 400 of the magnetic disc 134 for writing information on the first recording surface 400, and a read transducer 320 positioned proximate to the first recording surface 400 of the magnetic disc for reading information from the first recording surface 400. The disc drive 100 also includes a controller 220 within the disc storage system. The controller 220 is coupled to the read 320 and write transducers 310. The controller 220 positions a center of the write transducer 310 over a target track at a write offset relative to a servo position. The controller 220 also positions a center of the read transducer 310 over a target track at a read offset relative to a servo position. The read offset is different than the write offset. The disc drive 100 of the magnetic disc storage system further includes a memory 180 within the disc drive and coupled to the controller 220. The memory 180 contains a read offset value relative to a servo position of the target track that is different than a write offset value relative to the servo position of the target track. The magnetic disc storage system further includes an information processing system 2000, a memory system 2032, 2034 operatively coupled to the information processing system 2004, an input/output system 2010 operatively coupled to the information processing system, and a data channel 2010 that operatively couples the information processing system to the disc drive. The controller 220 offsets the write transducer 310 from a centerline of the track during the write operation. The controller 220 moves the write transducer 310 in a single direction 800 when writing to the disc 134, and the controller 220 offsets the write transducer from a centerline of the track during the write operation. The controller offsets the write transducer 310 from a centerline of the track during the write operation to a position where one edge of the write transducer is positioned substantially at the track edge of the previously written track. The controller writes a first sequential record to a first data band 1310 having a selected number of tracks, and writes a second sequential record to a second data band 1320 having a selected number of tracks. The controller leaves a guard band 1300 between the first data band and the second data band. The controller recognizes a data placed in a format of a sequential record.

A disc drive 100 includes a disc 134 having a first recording surface 400, a write transducer 310 positioned proximate to the first recording surface 400 of the magnetic disc 134 for writing information on the first recording surface 400, a read transducer 320 positioned proximate to the first recording surface 400 of the magnetic disc 134 for reading information from the first recording surface 400, and a device for increasing track density of the disc drive. The device for increasing track density includes a controller 220 coupled to the read 320 and write transducers 310, wherein the controller 220 positions a center of the write transducer 310 over a target track at a write offset relative to a servo position and the controller 220 positions a center of the read transducer 320 over a target track at a read offset relative to a servo position, and wherein the read offset is different than the write offset. The magnetic disc drive 100 further includes a memory 180 coupled to the controller. The memory contains a read offset value relative to a servo position of the target track that is different than a write offset value relative to the servo position of the target track.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data storage device, comprising:
   a rotating disc assembly comprising a disc surface;
   a write transducer in operable transducing relationship to the disc surface;
   a plurality of adjacent data tracks on the disc surface;
   a first region comprising a subset of the adjacent data tracks disposed at a track-to-track spacing such that the write transducer at least partially overlaps a track with an adjacent track;
   a second region comprising a subset of the adjacent data tracks, wherein the second region does not contain any of the adjacent data tracks of the first region; and
   a guard band separating the first region and the second region, wherein data are written to a first track of the first region and to a second track adjacent the first track, wherein the write transducer is moved in a first radial direction between the first and second tracks such that the data written to the first track is encroached only on one side by the data written to the second track, wherein data are further written to a last track of the first region, wherein one or more intermediate tracks are interposed between the second track and the last track, and wherein the write member moves only in the first radial direction in traversing the intermediate tracks such that all data written to each intermediate track is encroached only on one side by data subsequently written to the respective adjacent track.

2. The data storage device of claim 1 further comprising sequential data stored on tracks in the first region.

3. The data storage device of claim 1 wherein the guard band further comprises a track which is located between the first region and second region.

4. The data storage device of claim 1 wherein the guard band comprises a track in one of the regions.

5. The data storage device of claim 1 wherein the guard band comprises the last track of the first region.

6. A data storage device, comprising:
   a rotating disc assembly comprising a disc surface;
   a write transducer in operable transducing relationship to the disc surface;
   a plurality of adjacent data tracks on the disc surface;
   a first region comprising a subset of the adjacent data tracks disposed at a track-to-track spacing such that the write transducer at least partially overlaps a track with an adjacent track;
   a second region comprising a subset of the adjacent data tracks, wherein the second region does not contain any of the adjacent data tracks of the first region; and
   a guard band separating the first region and the second region, wherein data are written to a first track of the first region, and wherein said data are only encroached upon from a single radial side of said first track by subsequent data written to the first region.

7. The data storage device of claim 6 further comprising sequential data stored on tracks in the first region.

8. The data storage device of claim 6 wherein the guard band further comprises a track which is located between the first region and second region.

9. The data storage device of claim 6 wherein the guard band comprises a track in one of the regions.

10. The data storage device of claim 6 wherein the guard band comprises the last track of the first region.

* * * * *